United States Patent [19]

Thometzek et al.

[11] Patent Number: 5,264,398
[45] Date of Patent: Nov. 23, 1993

[54] LEAD-, CADMIUM- AND BARIUM-FREE FRITS FOR CERAMIC GLAZES

[75] Inventors: Peter Thometzek, Spezzano di Fiorano; Christian Schlegel, Venegono Superiore, both of Italy

[73] Assignee: Bayer S.p.A., Milan, Italy

[21] Appl. No.: 923,568

[22] Filed: Aug. 3, 1992

[30] Foreign Application Priority Data

Aug. 13, 1991 [IT]  Italy .................. MI 91 A 002254

[51] Int. Cl.$^5$ .................................. C03C 8/04
[52] U.S. Cl. ........................ 501/21; 501/24; 501/26; 501/67
[58] Field of Search .............. 501/21, 24, 26, 67

[56] References Cited

U.S. PATENT DOCUMENTS

| | | | |
|---|---|---|---|
| 4,084,976 | 4/1978 | Hinton . | |
| 4,282,035 | 8/1981 | Nigrin . | |
| 4,340,645 | 7/1982 | O'Conor | 501/26 X |
| 4,970,178 | 11/1990 | Klimas et al. | 501/26 |
| 5,091,345 | 2/1992 | Becker | 501/26 X |
| 5,204,291 | 4/1993 | Nigrin | 501/67 X |

FOREIGN PATENT DOCUMENTS

| | | |
|---|---|---|
| 0267154 | 5/1988 | European Pat. Off. . |
| 157327 | 11/1982 | German Democratic Rep. . |
| 1028614 | 7/1983 | U.S.S.R. ............... 501/26 |
| 2090242 | 7/1982 | United Kingdom . |

OTHER PUBLICATIONS

Chemical Abstracts, vol. 89, No. 4, p. 322 (1978), Abstract No. 29553f.

*Primary Examiner*—Karl Group
*Attorney, Agent, or Firm*—Connolly & Hutz

[57] ABSTRACT

A frit composition for ceramic glazes is disclosed which is free of lead, cadmium and also barium. The composition contains $SiO_2$, $B_2O_3$, $Al_2O_3$, alkali metal oxide, CaO, ZnO, and optionally MgO, SrO, $TiO_2$, $Bi_2O_3$, $P_2O_5$ or $ZrO_2$.

2 Claims, No Drawings

LEAD-, CADMIUM- AND BARIUM-FREE FRITS FOR CERAMIC GLAZES

This invention relates to frits for ceramic glazes which are characterized by a high CaO content and low $B_2O_3$ and ZnO contents.

The quality of frits for glazes on ceramic bodies has to satisfy stringent requirements in view of the highly developed state of the art. They must be capable of forming a smooth, high-gloss surface on ceramic bodies after firing of the glaze both by the traditional method with firing times of 12 to 48 hours and by the so-called quick firing method with firing times of 0.5 to 6 hours. In addition, they must have a thermal expansion coefficient adapted to the particular bodies in the range from 55 to $75 \times 10^{-6}/°C$. at temperatures of 20° to 400° C. In addition, they have to show high resistance to the aggressive effect of acids and alkalis. Finally, they have to show excellent compatibility with decorative colors and, more particularly, with underglaze decorative colors, including critical colors, such as pink or black for example.

Frits free from lead and cadmium have also been proposed because these elements, as frit constituents, can cause health damage, particularly in the case of ceramic eating utensils, unless the frits overall show adequate resistance to acids and alkalis. For example, the elements in question can be dissolved out if the glaze is damaged. Lead- and cadmium-free frits are disclosed, for example, in U.S. Pat. Nos. 4,084,976, 4,282,035 and 4,340,645. However, the frits described there have certain contents of barium oxide.

Barium is a cardiac poison so that there is a need for frits free from barium oxide in order to rule out the danger of contamination with barium for all applications.

It has now been found that frits free from barium oxide which satisfy the stringent requirements of modern frits for ceramic glazes can be obtained if the calcium oxide content is increased to high levels of 13 to 16% by weight and if, in addition, the other constituents of the frits are used in certain quantities.

The present invention relates to lead-, cadmium- and barium-free frit compositions for ceramic glazes which are characterized by the following composition:

| | |
|---|---|
| 54 to 64 | parts by weight $SiO_2$ |
| 3 to 9 | parts by weight $B_2O_3$ |
| 8 to 13 | parts by weight $Al_2O_3$ |
| 2.5 to 6.0 | parts by weight alkali metal oxide |
| 0 to 2 | parts by weight MgO |
| 13 to 16 | parts by weight CaO |
| 0 to 6 | parts by weight SrO |
| 2 to 6 | parts by weight ZnO |
| 0 to 2 | parts by weight $TiO_2$ |
| 0 to 2 | parts by weight $Bi_2O_3$ |
| 0 to 1 | parts by weight $P_2O_5$ and |
| 0 to 2 | parts by weight $ZrO_2$. |

The above-mentioned composition of the glaze frits according to the invention is intended to make up at least 98% by weight of the frit as a whole. The sum total of the constituents mentioned above is preferably 100% by weight so that only unavoidable impurities from mineral raw materials should be present in a quantity of up to 0.5% by weight.

The alkali metal oxide content is made up of at most 1 part by weight $Li_2O$, at most 3 parts by weight $Na_2O$ and 2 to 5 parts by weight $K_2O$. In total, however, at least 2.5 and at most 6.0 parts by weight alkali metal oxide should be present. In particularly preferred frits according to the invention, the potassium oxide content is at least twice the content of sodium oxide and lithium together.

Surprisingly, the frits according to the invention may have a relatively high CaO content of 13 to 16% by weight and small contents of $B_2O_3$ and ZnO, in which case high gloss, high resistance to acids and alkalis and excellent compatibility with decorative colors, particularly underglaze colors, are achieved. With CaO contents below 13% by weight, decorative colors are attacked whereas, with contents above 16% by weight, the glaze undergoes a reduction in gloss or becomes dull through the separation of crystals.

The $B_2O_3$ content of the frits according to the invention is between 3 and 9%. If it is lower, the frits have inadequate gloss and an excessive expansion coefficient. If the $B_2O_3$ content is higher, delicate underglaze decorative colors are affected.

The ZnO content must be between 2 and 6% by weight. If it is lower, the frits again show inadequate gloss. If the ZnO content is higher, decorative colors are attacked. In addition, the glaze slip soon loses its stability so that it cannot be recycled to the production process.

An $Al_2O_3$ content of 8 to 13% by weight is critical to the resistance of the frits according to the invention to alkalis. Higher $Al_2O_3$ contents lead to a reduction in gloss. The resistance of the frits to alkalis can be additionally improved by $ZrO_2$ and/or $TiO_2$ contents of up to 2% by weight. Larger contents of $ZrO_2$ and/or $TiO_2$ cause a reduction in gloss or hazing.

The total alkali metal oxide content must be between 2.5 and 6% by weight in order on the one hand to guarantee adequate fusibility of the frit and, on the other hand, not excessively to increase the thermal expansion coefficient. The $Na_2O$ content is preferably between 0.2 and 1.5% by weight while the $K_2O$ content is in the range from 3.0 to 4.5% by weight in the absence of $Li_2O$. Glaze frits having these preferred alkali metal oxide contents are particularly suitable for quick firing, even for "Monoporosa" bodies, because these frits are distinguished by a high softening point which enables the body to be degassed before smooth flowing of the glaze.

The MgO content is 0 to 2% by weight and preferably 0.7 to 1.6% by weight. Contents above 2% by weight cause a reduction in gloss.

The SrO content may be up to 6% by weight without detriment to the glazes obtained. In preferred frits, however, SrO is completely omitted because it can attack and cause damage to the lining material of the melting furnaces.

A $Bi_2O_3$ content of 0 to 2% by weight increases the brilliance of the glazes. By contrast, frits containing more than 2% by weight $Bi_2O_3$ cause an unwanted yellow tinge.

A small $P_2O_5$ content generally leads to an improvement in the surface of the glaze.

Another ecological and economic advantage of the frits according to the invention lies in the absence of the element fluorine. With fluorine-containing glazes, this element can escape during the firing step, necessitating expensive waste gas cleaning units for the firing furnaces.

The frits according to the invention are melted from standard mineral raw materials, fritted and ground in the usual way. They are applied to the body in the form of a glaze slip containing at least 55% by weight (dry matter) frit according to the invention and, in addition, typical slip constituents, such as for example kaolin, bentonite, china clay, quartz, aluminium oxide, molochite, feldspar, talcum, pigments and/or opacifiers. The slip preferably contains at least 85% by weight (dry matter) of the frit according to the invention in order to avoid possibly troublesome effects of other excessive constituents of the slip.

The frits according to the invention are suitable for the glazing of ceramic crockery materials such as, for example, vitreous china, semi-vitreous china, bone china, hard white ware and soft porcelain. By virtue of their high resistance to alkalis and acids, they are particularly suitable for hotel porcelain. Other applications include the coating of ceramic tiles.

The frits may be applied to the ceramic body both in the form of a slip by dip or spray coating and in the form of a dry powder by powder coating. After corresponding pretreatment, the frits are also suitable for electrostatic powder spraying. In addition, frits having the particularly preferred alkali metal oxide contents according to the invention are suitable both for quick firing processes with firing times of 30 to 6 hours and for processing by the "Monoporosa" process.

The invention is illustrated by the following Examples in which the following tests were carried out:

Resistance to alkalis, i.e. detergents of the type used in dishwashing machines, was tested with a 0.3% aqueous solution of the product Super-Soilax obtainable from Economics Laboratories, Saint Paul, Minn., USA, at a temperature of 96° C. over 2×24 hours, as described in U.S. Pat. No. 4,282,035. In this test, the weight loss of the glazes described in the following was below 0.05% by weight. Neither surface defects nor any reductions in gloss occurred.

Resistance to acids is tested with 4% acetic acid over a contact time of 24 hours at room temperature. No change was observed in the glaze surface.

Compatibility with underglaze colors was tested using a particularly sensitive Cr—Sn pink pigment obtainable from Bayer AG,5090 Leverkusen, FRG. In addition, tests against the colors pink, blue, green, brown and black were also evaluated. The glazes produced from the frits according to the invention were highly compatible with these colors so that, after firing of the glaze, no changes in color could be observed, even under a microscope.

The following Examples were melted from standard raw materials for 30 minutes at 1,500° C., quenched in cold water and dried.

The composition of the frits according to Examples 1 to 5 is shown in Table 1, in parts by weight.

Determination of the thermal expansion coefficient between 20° and 400° C. using a dilatometer produced a value of $67 \times \pm 8 \times 10^{-7}/°C$.

EXAMPLES 1 TO 3

94 Parts by weight of according to Table 1, 6 parts by weight kaolin and 60 parts by weight water are ground for 2 hours in a ball mill to form a ceramic slip. Application to a ceramic vitreous china body by dip coating, drying and firing for 6 hours at 1,150° C. produces a high-gloss transparent glaze having excellent resistance to acids and alkalis and excellent compability with decorative colors.

EXAMPLE 4

90 Parts by weight frit No. 4, 5 parts by weight kaolin and also 5 parts by weight calcined kaolin and 60 parts by weight water are ground in a ball mill to form a ceramic slip. Spray application to a ceramic hard white ware body, drying and quick firing for 80 minutes at 1,230° C. produces a high-gloss transparent glaze having excellent resistance to acids and alkalis.

EXAMPLE 5

96 Parts frit No. 5, 4 parts by weight kaolin, 0.4 part by weight sodium carboxymethyl cellulose and 50 parts by weight water are ground in a ball mill to form a ceramic slip. Spray application to an uncalcined ceramic Monoporosa body, drying and quick firing for 50 minutes at 1,070° C. gives a high-gloss transparent glaze having a defect-free surface.

EXAMPLE 6

Frit 5 is processed to a free-flowing powder in accordance with DE-A 2 015 072 and is electrostatically applied to a ceramic monoporosa body with a Puesta gun. Firing was carried out as in Example 5. A high-gloss, transparent glaze having a defect-free surface was obtained.

TABLE 1

| Frit No. | 1 | 2 | 3 | 4 | 5 |
| --- | --- | --- | --- | --- | --- |
| $SiO_2$ | 58 | 56.8 | 60 | 58 | 57 |
| $B_2O_3$ | 3 | 8 | 3 | 4 | 7.5 |
| $Al_2O_3$ | 11 | 10 | 12 | 11 | 9.5 |
| $LiO_2$ | — | — | 0.5 | — | — |
| $Na_2O$ | 1.5 | 1.5 | 1.5 | 0.5 | 0.5 |
| $K_2O$ | 4 | 3.5 | 4 | 4 | 4 |
| MgO | 1.5 | 1.5 | 1.5 | 1.5 | 1.5 |
| CaO | 15 | 15 | 15 | 15 | 15 |
| SrO | — | — | — | — | — |
| ZnO | 5.5 | 2 | 2 | 5.5 | 4 |
| $ZrO_2$ | 0.25 | 1 | 0.25 | 0.25 | 0.25 |
| $TiO_2$ | — | — | — | — | 0.5 |
| $Bi_2O_3$ | — | 0.5 | — | — | — |
| $P_2O_5$ | 0.25 | 0.2 | 0.25 | 0.25 | 0.25 |

What is claimed is:

1. A frit composition for ceramic glazes which is free of lead, cadmium and barium, consisting of:

| | |
| --- | --- |
| 54 to 64 | parts by weight $SiO_2$; |
| 3 to 9 | parts by weight $B_2O_3$; |
| 8 to 13 | parts by weight $Al_2O_3$; |
| 2.5 to 6.0 | parts by weight alkali metal oxide; |
| 0 to 2 | parts by weight MgO; |
| 13 to 16 | parts by weight CaO; |
| 0 to 6 | parts by weight SrO; |
| 2 to 6 | parts by weight ZnO; |
| 0 to 2 | parts by weight $TiO_2$ |
| 0 to 2 | parts by weight $Bi_2O_3$; |
| 0 to 1 | parts by weight $P_2O_5$; and |
| 0 to 2 | parts by weight $ZrO_2$. |

2. The frit composition as claimed in claim 1, wherein the alkali metal oxide is selected from the group consisting of $Li_2O$, $Na_2O$, $K_2O$ and mixtures thereof.

* * * * *